United States Patent
Ikeda et al.

[11] Patent Number: 5,940,952
[45] Date of Patent: Aug. 24, 1999

[54] METHOD FOR APPLYING CORROSION-PROTECTIVE COATING TO JOINT BETWEEN CORROSION-PROTECTIVELY COATED STEEL PIPES

[75] Inventors: Ryouichi Ikeda; Minoru Komura, both of Osaka; Yoshihiro Okano; Norio Shoji, both of Tokyo; Toshiyuki Namioka, Kanagawa; Akio Kida, Tokyo; Kiyotaka Hirahara, Hyogo, all of Japan

[73] Assignees: Nitto Denko Corporation, Osaka; Nippon Kokan Co., Ltd., Tokyo; Nippon Kokan Koji Kabushiki Kaisha Kanagawa, Kanagawa, all of Japan

[21] Appl. No.: 08/730,018

[22] Filed: Oct. 11, 1996

[30] Foreign Application Priority Data

Oct. 12, 1995 [JP] Japan ................................. 7-264204
Aug. 8, 1996 [JP] Japan ................................. 8-210176

[51] Int. Cl.⁶ .................................................. B23P 17/00
[52] U.S. Cl. ........................... 29/423; 29/460; 156/86; 156/304.2
[58] Field of Search .................................. 29/460, 527.1, 29/423; 156/84, 85, 86, 87, 285, 286, 273.9, 274.2, 304.2, 304.6; 285/21.2, 381.4, 381.5; 264/449, 454; 219/535, 544; 425/14

[56] References Cited

U.S. PATENT DOCUMENTS

| | | | |
|---|---|---|---|
| 3,138,861 | 6/1964 | Gaido | .................................. 156/304.2 |
| 3,962,394 | 6/1976 | Hall | ......................................... 156/285 |
| 4,323,607 | 4/1982 | Nishimura | ................................. 156/84 |
| 4,709,948 | 12/1987 | Archer et al. | ............................ 156/86 |
| 4,802,509 | 2/1989 | Brandolf | .................................... 156/86 |
| 5,226,995 | 7/1993 | White | ................................... 156/304.2 |

FOREIGN PATENT DOCUMENTS

| | | | |
|---|---|---|---|
| 47-31198 | 8/1972 | Japan . | |
| 0075825 | 6/1981 | Japan | ..................................... 156/86 |
| 5-315039 | 11/1993 | Japan . | |
| 8-132449 | 5/1996 | Japan . | |

*Primary Examiner*—David P. Bryant
*Attorney, Agent, or Firm*—Sughrue, Mion, Zinn, Macpeak & Seas, PLLC

[57] ABSTRACT

A method for applying a corrosion-protective coating, with a heat-shrinkable tube, to a joint between welded end portions of corrosion-protectively coated steel pipes, has a configuration comprising the steps of: preparing a coating implement having a releasant layer formed on the outer circumferential portion of the heat-shrinkable tube, and a heating layer formed on the outer circumferential portion of the releasant layer; positioning the coating implement so as to cover the welded portion of the joint and its adjacent portions; thermally shrinking the coating implement in a state in which the gap between the coating implement and the aforementioned portions is kept in a vacuum; and removing the releasant layer and the heating layer, whereby the aforementioned portions are corrosion-protectively coated by the heat shrinkage of the tube.

6 Claims, 5 Drawing Sheets

METHOD FOR APPLYING CORROSION-PROTECTIVE COATING TO JOINT BETWEEN CORROSION-PROTECTIVELY COATED STEEL PIPES

BACKGROUND OF THE INVENTION

1. Field of the Invention

The present invention relates to a method for applying a corrosion-protective coating to a joint between corrosion-protectively coated steel pipes which are used in pipelines for town's gas, city water, petroleum, district heating steam, etc.

2. Description of the Prior Art

Generally, steel pipes are used for a piping arrangement for carrying town's gas, city water, petroleum, steam, etc. Because a steel material for such a type steel pipe has a defect of being corroded easily under the presence of water or oxygen, the surface of the steel pipe is generally corrosion-protectively coated with asphalt, coal tar enamel or polyethylene (PE), epoxy, urethane, etc. to thereby provide a corrosion-protective coating layer (referred to as "factory coating layer" because the corrosion-protective coating layer is formed in a factory) on the surface of the steel pipe.

When such corrosion-protectively coated steel pipes having corrosion-protective coating layers respectively are used, there arises a problem that the corrosion-protective coating layers are deteriorated by a high temperature upon welding when piping construction is performed by welding the respective end portions of the corrosion-protectively coated steel pipes. In order to prevent the deterioration of the corrosion-protective coating layers, therefore, the corrosion-protective coating layers in the vicinity of the end portions of the two corrosion-protectively coated steel pipes are removed in advance so that after the end portions are connected to each other by on-site welding, a corrosion-protective heat-shrinkable tube or a corrosion-protective heat-shrinkable sheet is set to cover the outer circumference of the welded portion of the joint and the outer circumference of adjacent portions adjacent to the joint where the surfaces of the steel pipes are exposed because the corrosion-protective coating layers are removed. Then, the heat-shrinkable tube or sheet is heated by propane gas, or the like, so as to be thermally shrunk to thereby corrosion-protectively cover the welded and adjacent portions with the heat-shrinkable material. The corrosion-protective coating method for on-site piping construction is very excellent in corrosion protectivity and a lot of practical examples have been provided because the corrosion-protectively coated steel pipes can be protected from corrosive factors such as water, air, etc. and can be prevented from being corroded by taking the lap between the corrosion-protective coating layer and the heat-shrinkable material sufficiently.

In the aforementioned corrosion-protective coating method, however, the surfaces of the portions which are necessary for corrosion protection, that is, the flat portions (the surface of the corrosion-protective coating layer and the steel pipe surfaces after the removal of the corrosion-protective coating layer) in the two end portions of the corrosion-protectively coated steel pipes, the thickened portion in the welded connection portion, the level-difference portions (between the steel pipe surface and the corrosion-protective coating layer) generated by the removal of the corrosion-protective coating layer, and other portions, are not always smooth and are not even. Accordingly, air often remains in the portion thickened by welding, the level-difference portions, etc. when the corrosion-protective heat-shrinkable tube, or the like, is thermally shrunk. Furthermore, also in the flat portions of the steel pipe surface, the corrosion-protective coating layer, etc. air void is not avoidable at the time of thermally shrinking. Although the amount of such remaining air is too small to cause a problem practically, there are a feeling of uneasiness about progress of corrosion caused by the remaining air, a feeling of uneasiness about safety of strength of the air-remaining portion against mechanical load such as impact, or the like, and so on.

Various methods have been therefore carried out to eliminate air remaining, or the like, in the corrosion-protective coating portion of the heat-shrinkable material. For example, a method in which the level-difference portion is filled in advance with a material such as a sealing material, or the like, mainly containing butyl rubber or a method in which a hot-melt material mainly containing asphalt or butyl rubber is applied in advance onto the flat portions of the steel pipe surface, the corrosion-protective coating layer, etc., is employed. In each of the methods, however, air void cannot be perfectly prevented from remaining. Furthermore, in the latter method, there arise a problem of gas generation and a problem of safety in dealing with high-temperature fluid, or the like, because melting and application of the hot-melt material are necessary in on-site piping construction.

SUMMARY OF THE INVENTION

The present invention is based on such circumstances and an object thereof is to provide a method for applying a corrosion-protective coating to a joint between corrosion-protectively coated steel pipes with a heat-shrinkable material without any air remaining in a corrosion-protective coating portion of the heat-shrinkable material.

According to the present invention, there is provided a method for applying a corrosion-protective coating to a joint between welded end portions of corrosion-protectively coated steel pipes, comprising the steps of: removing corrosion-protective coatings of the steel pipes at end portions thereof so as to expose surfaces of the steel pipes; welding the end portions of the steel pipes; positioning a coating implement so as to cover an outer circumference of a welded portion of the joint and outer circumferences of adjacent portions adjacent to the joint in which the corrosion-protective coatings are removed, the coating implement including a heat-shrinkable tube, a releasant layer formed on an outer circumference of the heat-shrinkable tube and a heating layer formed on an outer circumference of the releasant layer; evacuating a gap between the coating implement and each of the welded and adjacent portions into a vacuum state; heating the heat-shrinkable tube by the heating layer to thermally shrink thereof; and removing the heating layer after the heat-shrinkable tube is thermally shrunk.

That is, the present inventors have made a series of researches to prevent air from remaining in the corrosion-protective coating portion with the heat-shrinkable material when the joint is corrosion-protectively coated with the heat-shrinkable material after the respective end portions of the corrosion-protectively coated steel pipes are connected to each other by on-site welding in a state in which the surfaces of the steel pipes are exposed by removing the corrosion-protective coating layers in the vicinity of the respective end portions of the corrosion-protectively coated steel pipes in advance. As a result, it has been found that air does not remain in the corrosion-protective coating portion when the heat-shrinkable material is thermally shrunk in a vacuum state. The founding has reached the present invention. Further, in the present invention, a heating layer can be removed after the heat-shrinkable tube is thermally shrunk because the heating layer is provided on the outer circumferential portion of the heat-shrinkable tube through a releasant layer. Accordingly, problems (early progress of corrosion caused by corrosion of metal [metal wire such as copper wire, or the like, is often used as a heater] and generated even in the case where the heating layer was broken, poor external appearance, abrasion, or the like, caused by surface roughness, etc.) in the case where the heating layer remains can be eliminated easily. Particularly, when an adhesive agent layer is formed on the inner circumferential surface of the heat-shrinkable tube, the heat-shrinkable tube is heated to be thermally shrunk in a vacuum state and, at the same time, the heat-shrinkable tube is stuck to the surface of the welded portion of the joint between the steel pipes and to the surfaces of the pipes in portions adjacent to the joint, by the action of the adhesive agent layer so that the remaining of air can be reduced. Further, when two vacuum generators are connected to the split molds to keep the gap between the coating implement and each of the welded portion of the joint and its adjacent portions in a vacuum after the split molds are disposed on the outer circumference of the coating implement, one of the two vacuum generators is operated to evacuate the inside of the split molds to a vacuum when the inside of the split molds is to be evacuated and the coating implement is thermally shrunk in that state, and lowering of the degree of vacuum in the split molds at the time of thermal shrinking is recovered by the operation of the other vacuum generator to thereby keep the degree of vacuum in the initial value. Thus, the degree of vacuum can be recovered to the initial value even in the case where the degree of vacuum in the split molds is lowered at the time of thermal shrinking of the heat-shrinkable tube.

DETAILED DESCRIPTION OF THE PREFERRED EMBODIMENT

Figure 1:
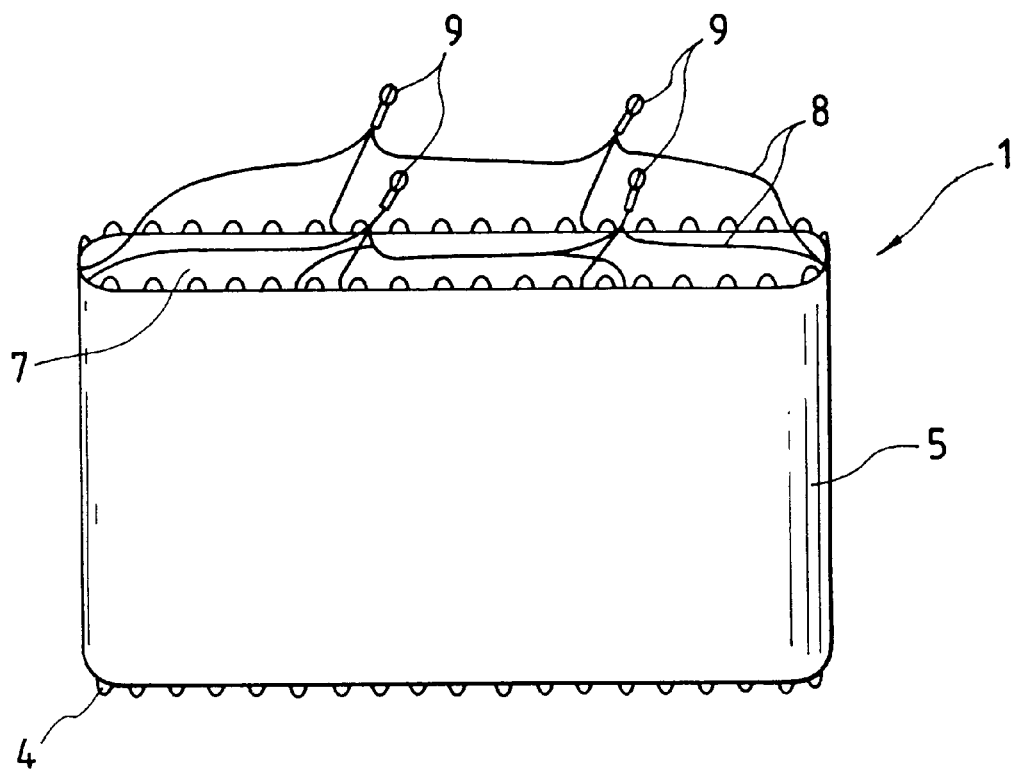
FIG. 1 is an explanatory view showing an actual example of a coating implement used in the present invention.

The present invention will be described below in detail.

The method according to the present invention uses a coating implement positioned on the outer circumference of a welded portion of a joint and on the outer circumference of adjacent portions adjacent to the joint where corrosion-protective coatings are removed to expose the surfaces of steel pipes, and a vacuum keeping device for keeping a gap between the coating implement and each of the welded and adjacent portions in a vacuum state. Further, the aforementioned coating implement has a configuration in which a releasant layer is formed on the outer circumferential portion of a heat-shrinkable tube, and a heating layer is formed on the outer circumferential portion of the releasant layer.

As the aforementioned heat-shrinkable tube, any tube may be used so long as the tube has heat shrinkability. Preferably, a plastic tube having heat shrinkability is used. Examples of such a plastic material include polyethylene, modified polyethylene, polyvinyl chloride, polypropylene, ethylene-vinyl acetate copolymer, fluororesin such as polytetrafluoroethylene, tetrafluoroethylene-perfluoroalkyl vinyl ether copolymer, etc. Further, as the heat-shrinkable tube, it is possible to use a material shaped like a tube initially, a material shaped like a tube by sewing opposite end portions of a belt-like matter together to join the end portions, a material shaped like a tube at the time of carrying out this method by chucks provided in opposite end portions of a belt-like matter, and so on.

The aforementioned releasant layer may be formed from a material which is not fused at the temperature of heat shrinkage of the heat-shrinkable tube. For example, a plastic film which is not fused at the temperature of heat shrinkage of the heat-shrinkable tube may be taken as an instance. Further, silicone oil, silicone grease, or the like, may be also used.

The heating layer is provided on the outer circumferential portion of such a releasant layer. The heating layer serves to heat the heat-shrinkable tube in a vacuum state to thereby thermally shrink the tube. A material which generates heat by electric current conduction is suitable for the heating layer. Examples of the current-conduction heat generation type heating layer include an electrically insulating layer formed from plastics or rubber in which a heating wire (copper wire, or the like) is disposed, a current-conduction heating sheet molded from a mixture of electrically conductive powder such as carbon powder, metal powder, or the like, and plastics or rubber, and so on. Further, this heating layer may be used whether it follows the heat shrinkage of the heat-shrinkable tube or not. Incidentally, when the heating layer is formed from a material following the heat shrinkage of the heat-shrinkable tube, the heating wire is preferably disposed so as to meander in the circumferential direction to facilitate the following (see FIG. 3).

Further, when an adhesive agent layer is formed on the inner circumferential surface of the heat-shrinkable tube, there arises an advantage that not only the residue of air in the aforementioned welded and adjacent portions can be reduced but also the heat-shrinkable tube is stuck to the aforementioned welded and adjacent portions to facilitate the formation of a coating. This adhesive agent layer may be formed by a method in which the adhesive agent layer is formed simultaneously with the heat-shrinkable tube upon formation of the heat-shrinkable tube, a method in which an adhesive agent is applied to the inner circumferential surface of the heat-shrinkable tube after the formation of the heat-shrinkable tube, or the like. Further, as the adhesive agent, it is possible to use any one of a pressure-sensitive adhesive agent, a hot-melt adhesive agent, a heat-hardening adhesive agent, a mastic type adhesive agent, and so on.

As the device for keeping the gap between the coating implement and each of the aforementioned welded and adjacent portions in a vacuum state, a close device of an integral-type may be used or a closed device of a split-type in which the device is divided into two or three parts, or the like, may be used. As the device for evacuating such a vacuum keeping device, it is possible to use a vacuum pump, or the like. Further, evacuation by the evacuating device needs to be continued until the heat shrinkage of the heat-shrinkable tube is completed. Although the degree of vacuum is not limited specifically because it can be selected suitably correspondingly to various conditions, it is generally selected to be not more than about 200 Torr, preferably in a range of from 1 to 100 Torr. Further, it is preferable to use two evacuating devices. With use of two evacuating devices, the inside of the aforementioned split-type device is evacuated to a predetermined degree of vacuum by the first evacuating device and the heating layer is made to generate heat in the state of a vacuum, and if the degree of vacuum is lowered because of leakage, or the like, from the seal portion of the vacuum keeping device in the duration of temperature rising of the heating layer due to its heat generation, the degree of vacuum can be recovered to and kept in the initial value by operating the second evacuating device.

The mode of carrying out the present invention will be described below on the basis of the drawings.

Figure 2:
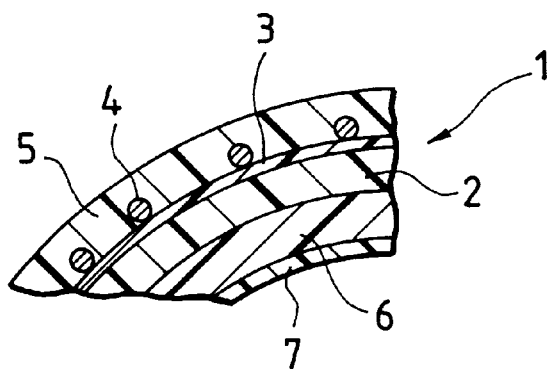
FIG. 2 is a partly sectional view of the coating implement.
Figure 3:
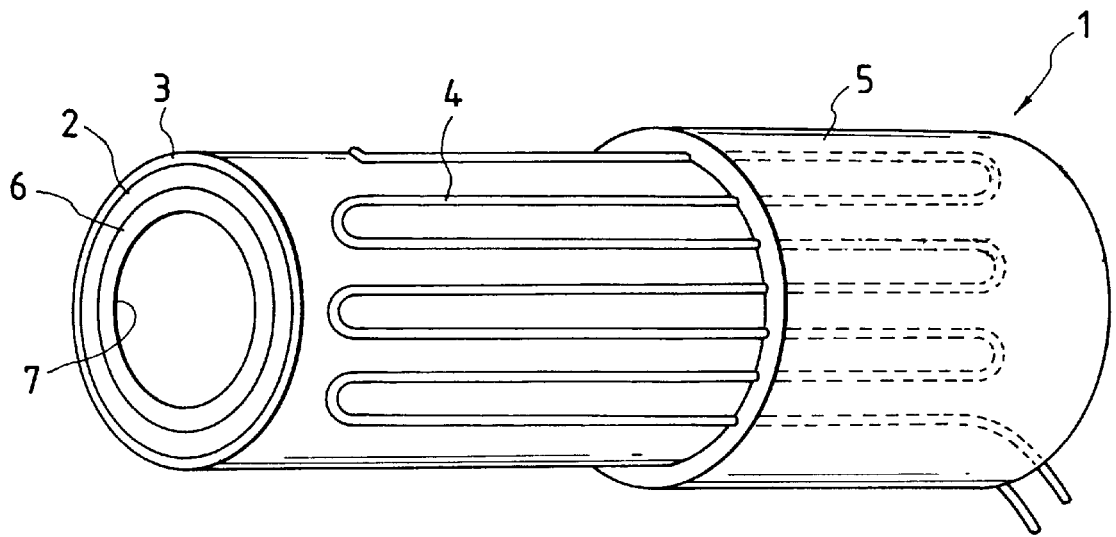
FIG. 3 is a partly cutaway perspective view of the coating implement.

FIG. 1 shows an actual embodiment of the coating implement to be used in the present invention. In this coating implement 1, as shown in FIGS. 2 and 3, a releasant layer 3 formed from a plastic film, or the like, which is not fused at the temperature of heat shrinkage of a heat-shrinkable tube 2 is provided on the outer circumferential portion of the heat-shrinkable tube 2, and a heating layer 5 is provided on the outer circumferential portion of the releasant layer 3. Further, a heating wire 4 (for example, copper wire) is disposed so as to meander along the circumference of the heating layer 5. On the other hand, an adhesive agent layer 6 is provided on the inner circumferential surface of the heat-shrinkable tube 2 and, further, a separator 7 is temporarily attached on the adhesive agent layer 6 so as to be able to be freely separated. In the drawings, the reference numeral 8 designates lead wires; and 9, connection terminals.

Figure 4:
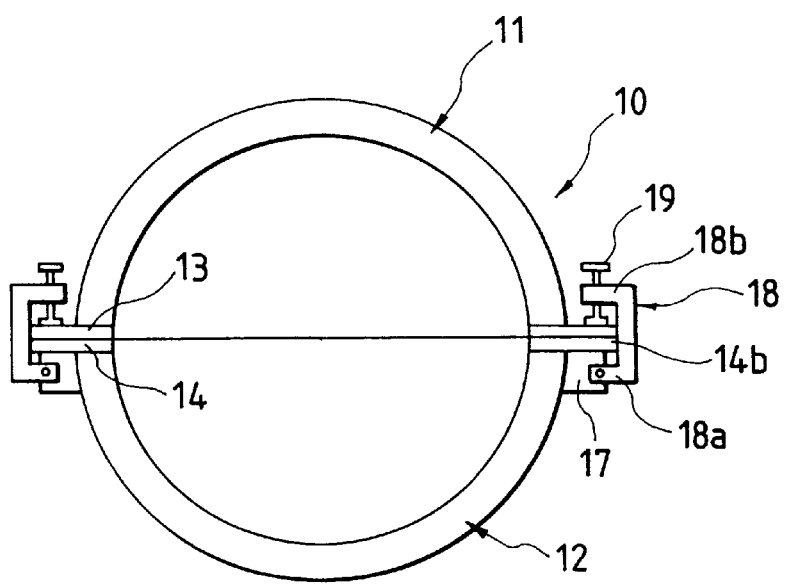
FIG. 4 is an explanatory view showing a vacuum chamber used in the present invention.
Figure 5:
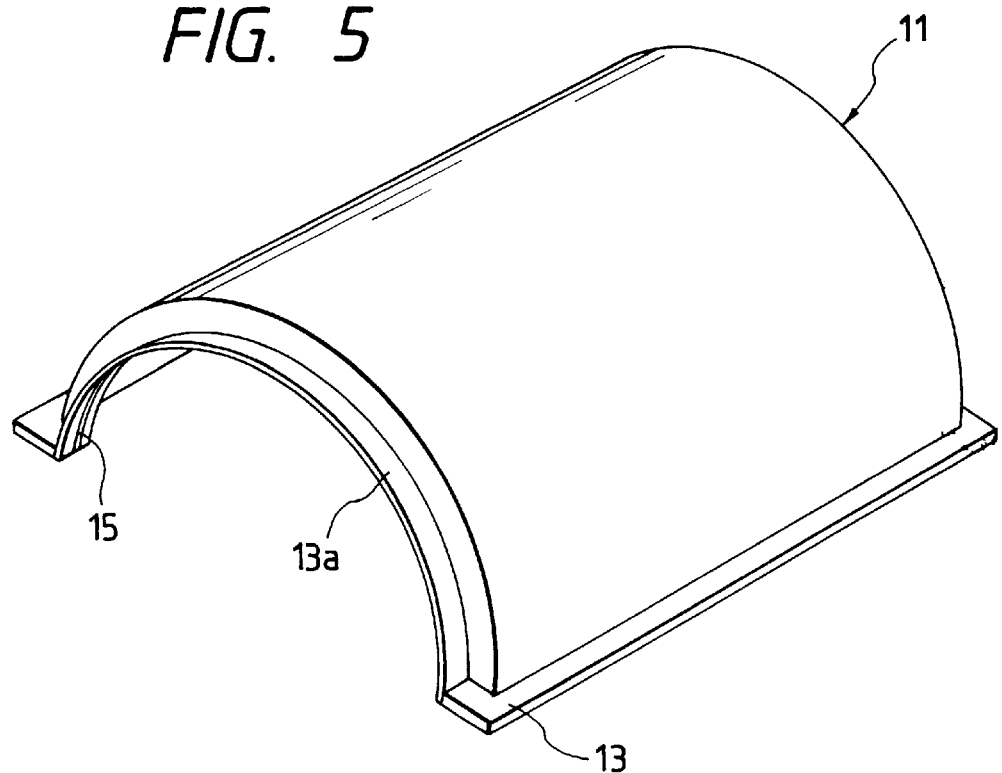
FIG. 5 is a perspective view showing an upper split mold of the vacuum chamber.

FIG. 4 shows a vacuum chamber (vacuum keeping device) 10 used in the present invention. The vacuum chamber 10 shaped like a cylinder of the type divided into two parts is constituted by a pair of upper and lower molds 11 and 12 each shaped like a semicylinder. As shown in FIG. 5, a flange portion 13 is formed in the lower end surface of the upper molds 11 so as to project. O-ring mount grooves 15 are formed in the lower surfaces (which abut on the outer circumferential surfaces of corrosion-protective coating layers 24 and 25 of corrosion-protectively coated steel pipes 22 and 23 which will be described later) of two flange portions 13a (one of which is formed in one end portion but is hidden so as not to be seen) formed in end portions perpendicular to the longitudinal direction of the flange portion 13. On the other hand, a flange portion 14 facing the flange portion 13 of the upper mold 11 is formed in the lower end surface of the lower mold 12 so as to project in the similar manner to the upper mold 11. O-ring mount grooves are formed in the lower surfaces of flange portions 14a formed in end portions perpendicular to the longitudinal direction of the flange portion 14 (see FIG. 8). Further, fixing means are formed in two places on each of two side portions 14b along the longitudinal direction of the flange portion 14 of the lower mold 12. Each of the fixing means comprises a block 17 fixed to the lower surface of the flange portion 14b, a U-shaped fixture 18 having a lower piece 18a of the U-shape attached to the block 17 so as to hinge freely, and a clamping screw rod 19 screwed into a screwhole (not shown) formed in an upper piece 18b of the U-shape of the fixture 18. The flange portions 13 and 14 of the upper and lower molds 11 and 12 are stuck to each other by screwing the clamping screw rod 19 so that the vacuum state of the inside can be kept.

Figure 6:
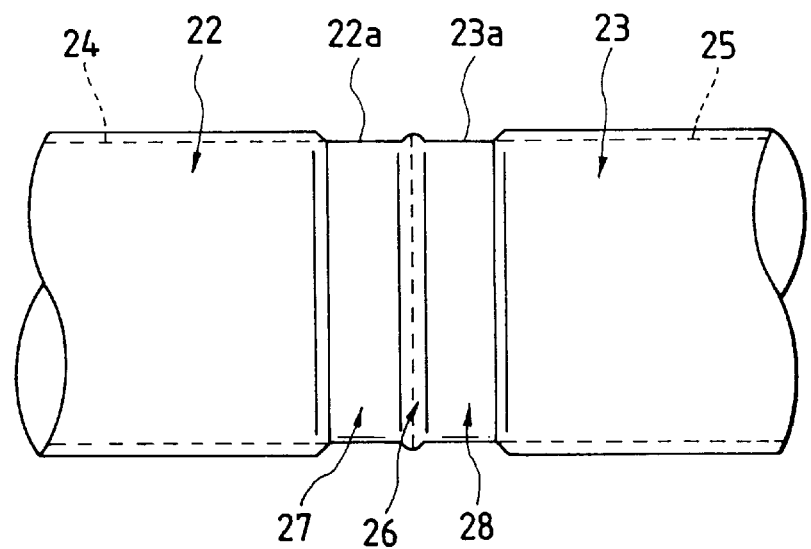
FIG. 6 is an explanatory view showing a procedure of the present invention.
Figure 7:
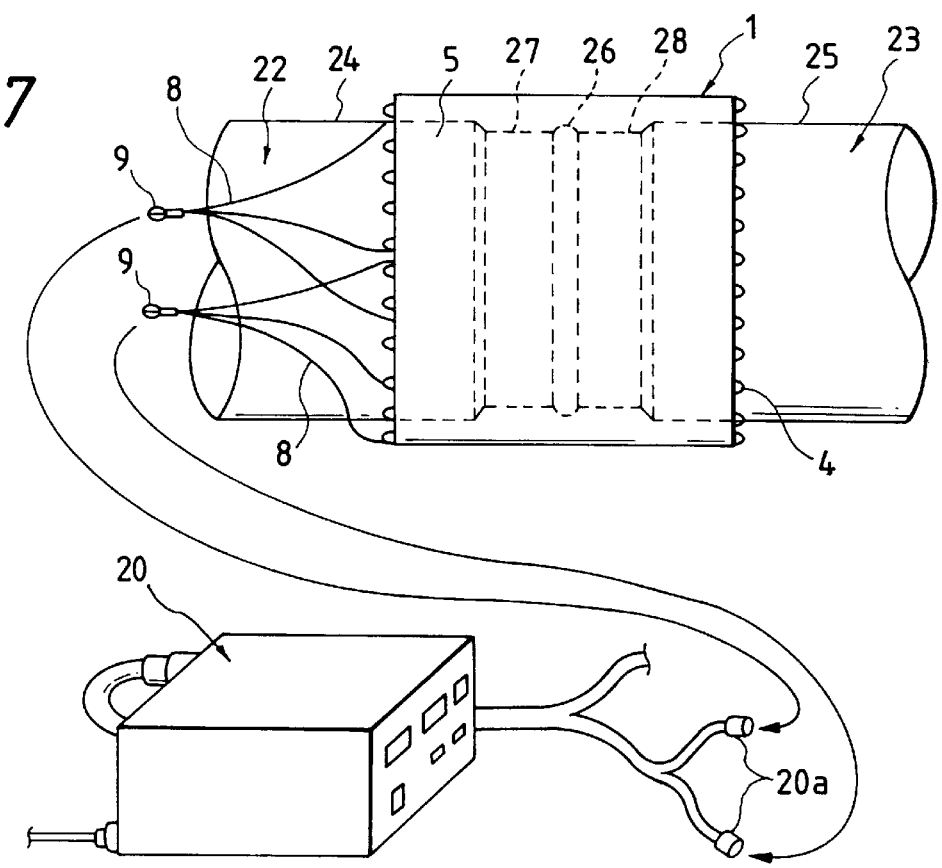
FIG. 7 is an explanatory view showing a procedure of the present invention.
Figure 8:
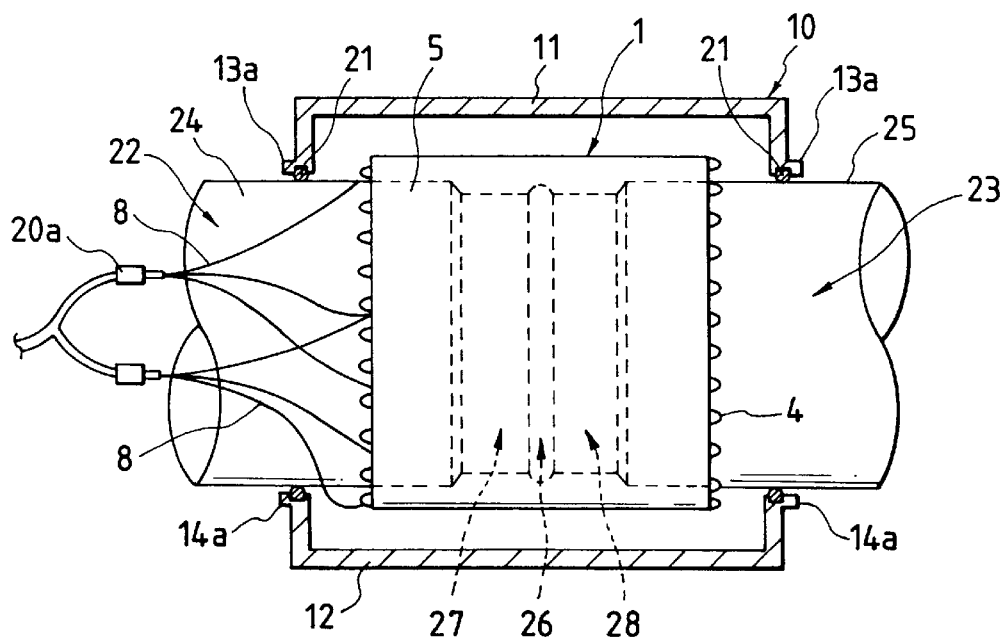
FIG. 8 is an explanatory view showing a procedure of the present invention.
Figure 9:
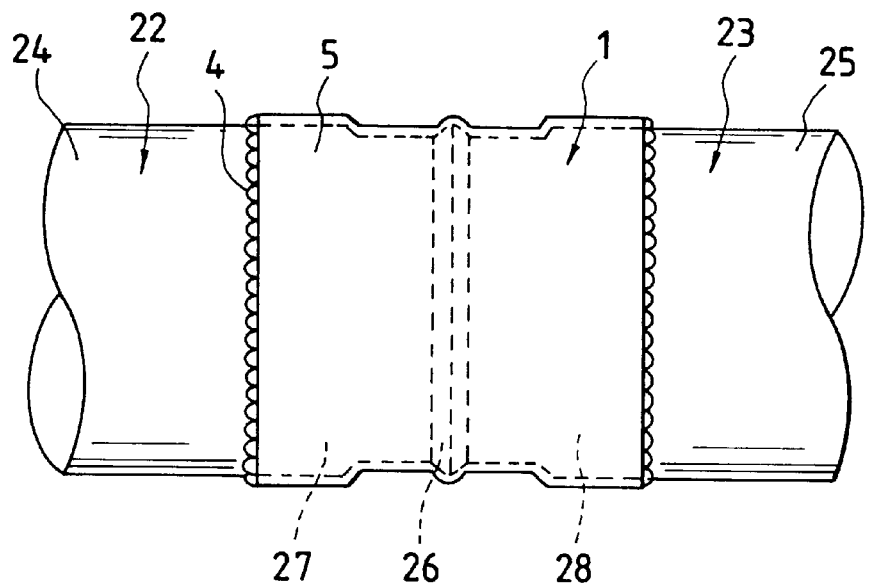
FIG. 9 is an explanatory view showing a procedure of the present invention.
Figure 10:
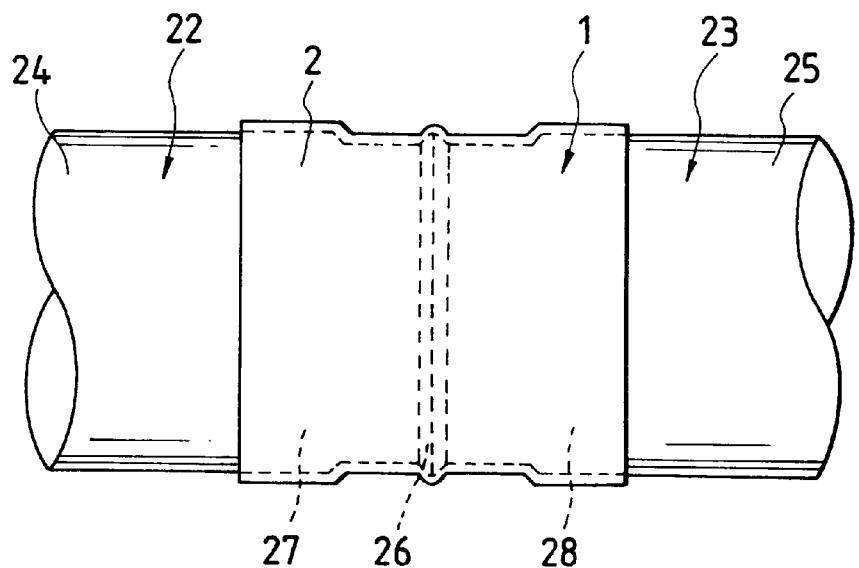
FIG. 10 is an explanatory view showing a procedure of the present invention.

Using such a aforementioned coating implement 1, the vacuum chamber 10, two vacuum pumps (not shown), etc., the joint between corrosion-protectively coated steel pipes 22 and 23 can be corrosion-protectively coated as follows. That is, as shown in FIG. 6, corrosion-protective coating layers 24 and 25 at the respective end portions of the two corrosion-protectively coated steel pipes 22 and 23 to be joined to each other are first removed, and then the two end portions of the steel pipes are joined to each other by on-site welding. In the drawing, the reference numeral 26 designates a welded portion; and 27 and 28, adjacent portions where surfaces 22a and 23a of the steel pipes are exposed. Then, as shown in FIG. 7, the coating implement 1 from which the separator 7 is separated is positioned and set so as to cover the welded portion 26, the adjacent portions 27 and 28 and portions of the corrosion-protective coating layers 24 and 25 near the adjacent portions 27 and 28. Four connection terminals 9 (of which two connection terminals are shown in the drawing) of the coating implement 1 are connected to output terminals 20a (of which two output terminals are shown in the drawing) of an electric source controller 20. Then, as shown in FIG. 8, the vacuum chamber 10 is set (in this occasion, O-rings 21 are mounted into the O-ring mount grooves 15 of the upper and lower molds 11 and 12). Then, a first one of the two vacuum pumps is connected to the vacuum chamber 10 and operated (made into a communicated state) to evacuate the vacuum chamber 10 into a vacuum state (for example, 60 Torr or less). In this state, the electric source controller 20 is turned on to make an electric current flow in the heating wire 4 so that the heating wire 4 generates heat. When the degree of vacuum in the vacuum chamber 10 is lowered (for example, to 100 Torr) by the rising of the temperature in the inside of the vacuum chamber 10 because of the heat generation, the second vacuum pump is connected to the vacuum chamber 10 and operated (made into a communicated state) to recover and keep the degree of vacuum to the value obtained at the time of operating the first vacuum pump. Further, the heat-shrinkable tube 2 is thermally shrunk by the heat generation due to current-conduction so that the aforementioned portions 26 to 28, and so on, are corrosion-protectively coated. After the current conduction and the operation of the vacuum pumps are then stopped, the vacuum chamber 10 is removed and, as shown in FIG. 9, the lead wires 8 of the coating implement 1 are cut off. After that, the heating layer 5 and the releasant layer 3 are removed. In such a manner, as shown in FIG. 10, the joint between the corrosion-protectively coated steel pipes 22 and 23 can be coated with a heat-shrinkable material. Although this embodiment shows the case where the releasant layer 3 is removed, the releasant layer 3 may be left on the thermally shrunk tube alternatively.

A resultant product of the present invention will be described below. In this product, town's gas pipes each having a diameter of 750 mm and having a corrosion-protective coating layer of polyethylene on its outer circumferential surface are used as the corrosion-protectively coated steel pipes 22 and 23. The corrosion-protective coating layers at the respective end portions of the two pipes are removed in advance by 150 mm in the longitudinal direction of the pipes. Further, Neoheat Cover 1150E made by NITTO DENKO CORPORATION adjusted to an inner diameter of 850 mm and a length of 600 mm is used as the coating implement. This coating implement comprises a releasant layer formed by winding a polyethylene terephthalate film (thickness: 100 $\mu$m, melting point: about 260° C.) by one turn on the outer circumferential portion of a heat-shrinkable polyethylene tube (thickness: 1.5 mm, heat shrinkage rate: 50%, heat shrinkage temperature: 130° C.), a heating layer of polyethylene (thickness: 1 mm, not heat-shrinkable) provided with a copper wire (diameter: 0.7 mm) disposed on the outer circumferential portion of the releasant layer, and a separator temporarily attached onto an adhesive agent layer provided on the inner circumferential portion of the tube. Incidentally, the copper wire is disposed in the heating layer so as to meander. Accordingly, the structure of the coating implement is the same as shown in FIGS. 1 to 3.

After the joint of the town's gas pipes is corrosion-protectively coated with the heat-shrinkable tube 2 by the above-mentioned method, the heat-shrinkable tube 2 is removed in order to check whether air remains in the welded portion, the steel pipe surfaces, the level-difference portions, etc. of the joint or not. As a result, there is no air remaining in the welded portion, the steel pipe surfaces, the level-difference portions, etc. of the joint. That is, there is obtained a coating state incomparably better than the conventional technique. The effect of the corrosion-protective coating method, according to the present invention, by using the heat-shrinkable tube in a vacuum system is apparent.

As described above, in the method for applying a corrosion-protective coating to a joint between corrosion-protectively coated steel pipes according to the present invention, air is prevented from remaining in the corrosion-protective coating portion of the heat-shrinkable material even in the case where the joint is corrosion-protectively coated with the heat-shrinkable material after the end portions of the corrosion-protectively coated steel pipes are connected to each other by on-site welding in a state in which the steel pipe surfaces are exposed by removing in advance the corrosion-protective coating layers in the vicinity of the end portions of the corrosion-protectively coated steel pipes. Further, in the present invention, a heating layer can be removed after the heat-shrinkable tube is thermally shrunk because the heating layer is provided on the outer circumferential portion of the heat-shrinkable tube through a releasant layer. Accordingly, problems (early progress of corrosion caused by corrosion of metal [metal wire such as copper wire, or the like, is often used as a heater] and generated even in the case where the heating layer was broken, poor external appearance, abrasion, or the like, caused by surface roughness, etc.) in the case where the heating layer remains can be eliminated easily. In the present invention, particularly, when an adhesive agent layer is formed on the inner circumferential surface of the heat-shrinkable tube, the heat-shrinkable tube is heated to be thermally shrunk in a vacuum state and, at the same time, the heat-shrinkable tube is stuck to the surface of the welded portion of the joint between the steel pipes and to the surfaces of the pipes in portions adjacent to the joint, by the action of the adhesive agent layer so that the remaining of air can be reduced. Further, when two vacuum generators are connected to the split molds to keep the gap between the coating implement and each of the welded portion of the joint and its adjacent portions in a vacuum after the split molds are disposed on the outer circumference of the coating implement, one of the two vacuum generators is operated to evacuate the inside of the split molds to a vacuum when the inside of the split molds is to be evacuated and the coating implement is thermally shrunk in that state, and lowering of the degree of vacuum in the split molds at the time of thermal shrinking is recovered by the operation of the other vacuum generator to thereby keep the degree of vacuum in the initial value. Thus, the degree of vacuum can be recovered to the initial value even in the case where the degree of vacuum in the split molds is lowered at the time of thermal shrinking of the heat-shrinkable tube.

What is claimed is:

1. A method for applying a corrosion-protective coating to a joint between welded end portions of corrosion-protectively coated steel pipes, comprising the steps of:

removing corrosion-protective coatings of said steel pipes at end portions thereof so as to expose surfaces of said steel pipes;

welding said end portions of said steel pipes together;

positioning a coating implement so as to cover an outer circumference of a welded portion of said joint and outer circumferences of adjacent portions adjacent to said joint from which said corrosion-protective coatings are removed, said coating implement including a heat-shrinkable tube, a releasant layer formed on an outer circumference of said heat-shrinkable tube and a heating layer formed on an outer circumference of said releasant layer;

disposing split molds, which are capable of keeping a gap between said coating implement and each of said welded and said adjacent portions in a vacuum, on an outer circumference of said welded portion and on outer circumferences of said adjacent portions so that said welded and said adjacent portions are positioned in an inside of said split molds;

connecting two vacuum generators to said split molds;

operating a first vacuum generator to evacuate said inside of said split molds;

heating said heat-shrinkable tube by said heating layer to thermally shrink said heat-shrinkable tube onto said joint and said adjacent portions;

operating a second vacuum generator to recover lowering of a degree of vacuum in said split molds at the time of thermally shrinking of said heat-shrinkable tube to thereby keep said degree of vacuum at its initial value; and removing said heating layer after said heat-shrinkable tube is thermally shrunk.

2. The method according to claim 1, wherein an adhesive agent layer is provided on an inner circumferential surface of said heat-shrinkable tube.

3. The method according to claim 1, wherein said heating layer generates heat by electric current conduction therethrough.

4. The method according to claim 3, wherein said heating layer includes a heating wire conducting said electric current and being disposed so as to meander along a circumference of said heating layer.

5. The method according to claim 1, wherein a material of said heat-shrinkable tube is selected from polyethylene, modified polyethylene, polyvinyl chloride, polypropylene, ethylene-vinyl acetate copolymer and fluororesin.

6. The method according to claim 5, wherein said fluororesin is selected from the group consisting of polytetrafluoroethylene and tetrafluoroethylene-perfluoroalkyl vinyl ether copolymer.

* * * * *